United States Patent [19]
Band

[11] 3,693,097
[45] Sept. 19, 1972

[54] GATE CONTROL APPARATUS FOR SETTING THE INPUT SIGNAL COUNTING INTERVAL

[72] Inventor: Ian T. Band, Los Altos, Calif. 94022

[73] Assignee: Hewlett-Packard Company, Palo Alto, Calif.

[22] Filed: Sept. 4, 1970

[21] Appl. No.: 69,534

[52] U.S. Cl. ............328/39, 307/220 R, 307/225 R, 328/41, 328/48, 328/140
[51] Int. Cl. ...................H03k 21/00, H03k 23/00
[58] Field of Search ........307/220, 223, 225; 328/39, 328/41, 48, 140; 324/78 D

[56] References Cited

UNITED STATES PATENTS 3,062,443 11/1962 Palmer.....................324/78 D
3,079,554 2/1963 Ranky..................324/78 D X Primary Examiner—Stanley D. Miller, Jr.
Attorney—A. C. Smith

[57] ABSTRACT

A decade counting and displaying assembly are combined with a reference frequency source, pulse shaper, gate control apparatus and conventional logic elements to provide a frequency measuring device that automatically determines a time interval during which the frequency of an input signal is counted. The same components are used to provide a multiperiod averaging device that automatically determines a number of periods an input signal is to be averaged.

4 Claims, 5 Drawing Figures

INVENTOR
IAN T. BAND

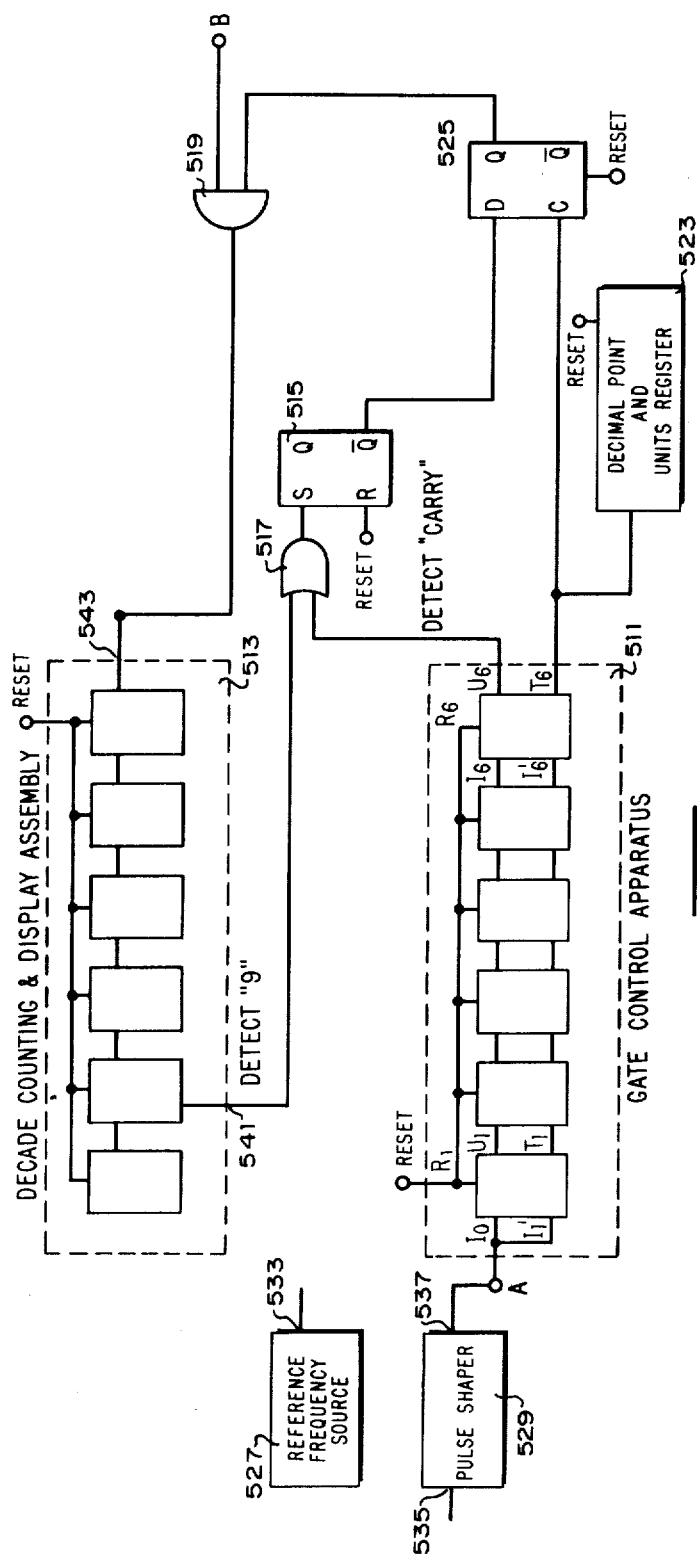
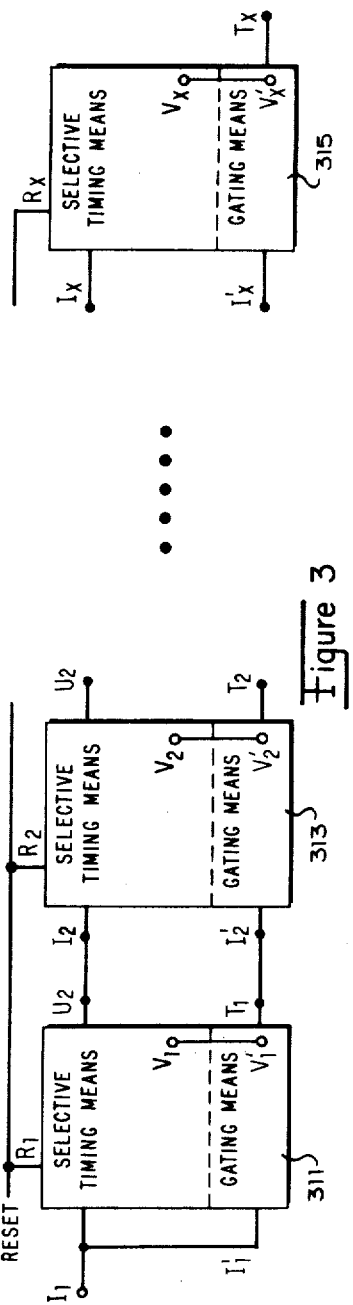
Figure 5
Figure 3
INVENTOR
IAN T. BAND

GATE CONTROL APPARATUS FOR SETTING THE INPUT SIGNAL COUNTING INTERVAL

BACKGROUND OF THE INVENTION

Certain known frequency measuring devices convert an input signal having an unknown frequency into uniform pulses. Frequency measurements are made by routing these pulses through a main gate and into a decade counting assembly where the pulses are totalized. The number of pulses totalized during the time interval the main gate is open is a measure of the average frequency of the input signal for that time interval. A time base selector switch is manually operated to select a time interval, position the decimal point and to select the appropriate measurement unit.

An error of ±1 count may be introduced into the measurement when the opening and closing of the main gate is unsynchronized with the input signal. The fractional effect of this error is 1/(total events counted) and therefore greater accuracy is achieved with longer time intervals.

One disadvantage of known frequency measuring devices is that the time interval (commonly referred to as the gate time) must be established prior to the initiation of a measurement. A gate time is selected and a measurement is initiated. If the input frequency is too high for that gate time, the decade counting assembly may overflow and another measurement at a shorter gate time may be needed. If the input frequency is too low for that gate time the accuracy and resolution of the measurement may be so poor that another measurement at a longer gate time may be needed. A similar problem is found in certain multiperiod averaging devices that require an operator to determine the number of periods of an input signal to average, prior to the initiation of a measurement.

The time base apparatus of certain known frequency measuring devices comprises a reference frequency source and a decade divider assembly. One disadvantage of this type of time base apparatus is that the decade divider has a separate output line for each separate gate time. The time base selector switch aforementioned selects which of these outputs is to be used to provide the gate time. This provides a significant problem when it is desired to have available a number of gate times and when the time base apparatus is being made as an integrated circuit.

SUMMARY OF THE INVENTION

The present invention provides a gate control apparatus that can be used in place of a decade divider assembly to provide an improved time base apparatus having an input and having a single output line for producing output signals representing different gate times as a function of the number of signal pulses applied at the input.

The gate control apparatus comprises a number of iterative stages, each stage having a drive input and a signal pulse input and each stage having a carry output and a gated output. A first stage has its drive input connected to its signal pulse input thus forming the single input to the gate control apparatus. The carry output of a preceding stage is connected to the drive input of a succeeding stage and the gated output of the preceding stage is connected to the signal pulse input of the succeeding stage. Signal pulses applied at the drive input (and hence signal pulse input) of the first stage cause a train of output signals to appear at the gated output of the last stage. Each input signal pulse $AB^0+1$, $AB^1+1$ ... $AB^{x-1}+1$, and $nB^x+1$ is gated through the gate control apparatus and appears at the gated output of the last stage. If the period of repetition of an input signal is $T$, output signals occur at times $t = AB^0T$, $AB^1T$ ... $AB^{x-1}T$, and $t = nB^xT$. $x$ is the number of iterative stages included in the gate control apparatus, $B$ is an integer greater than 1, $A$ is an integer greater than zero and less than or equal to $B-1$, and $n$ is an integer, zero or greater.

The carry output of each stage produces an output signal in response to each $C+nB$ signal appearing at the drive input of that stage, where $C$ is an integer constant greater than or equal to $A+1$ and less than or equal to $B$.

The gate control apparatus is combined with a decade counting and display assembly, reference frequency source, pulse shaper and conventional logic elements to provide an improved frequency measuring device that automatically selects a gate time during which the frequency of an input signal is to be counted while the measurement is in progress, so that the greatest measurement accuracy is achieved in a single measurement. A slightly different arrangement of these same elements provides an improved multiperiod averaging device that automatically determines a number of periods that an input signal is to be averaged, while the measurement is in progress.

BRIEF DESCRIPTION OF THE DRAWINGS

FIG. 3 shows a block diagram of a gate control apparatus according to the present invention;

FIG. 5 shows a simplified block diagram of an improved automatic frequency measuring device according to the present invention.

DESCRIPTION OF THE PREFERRED EMBODIMENT

Figure 1:
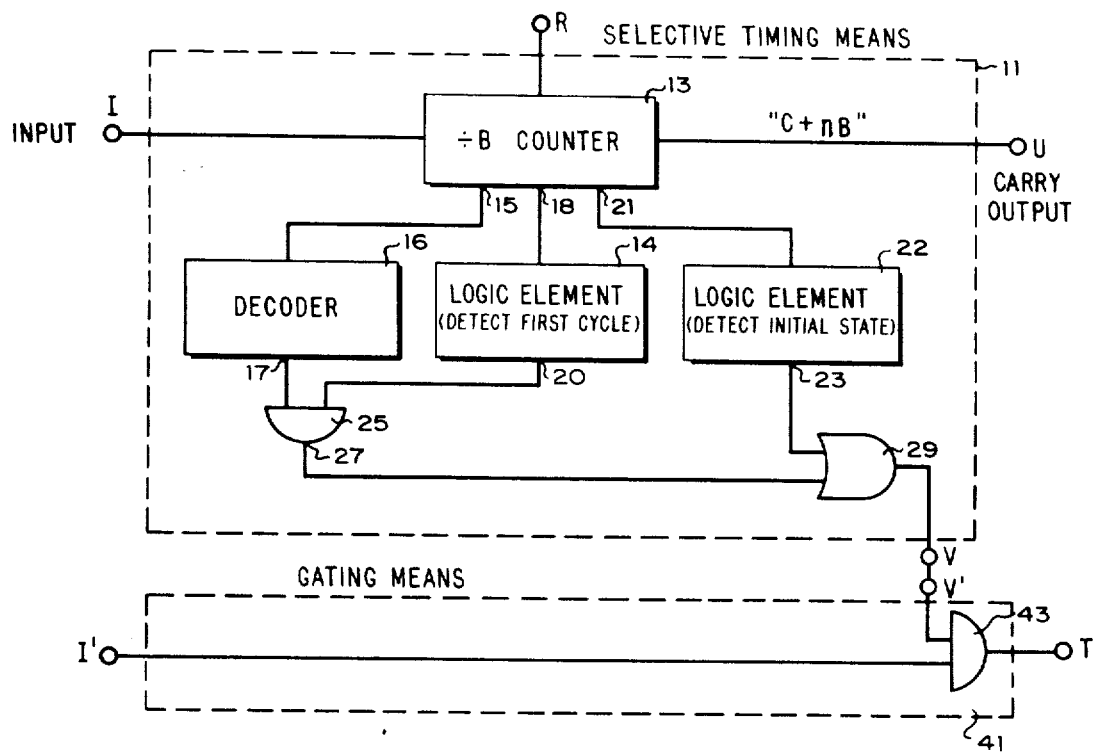
FIG. 1 shows a schematic representation of a single stage of a gate control apparatus according to the present invention.
Figure 2:
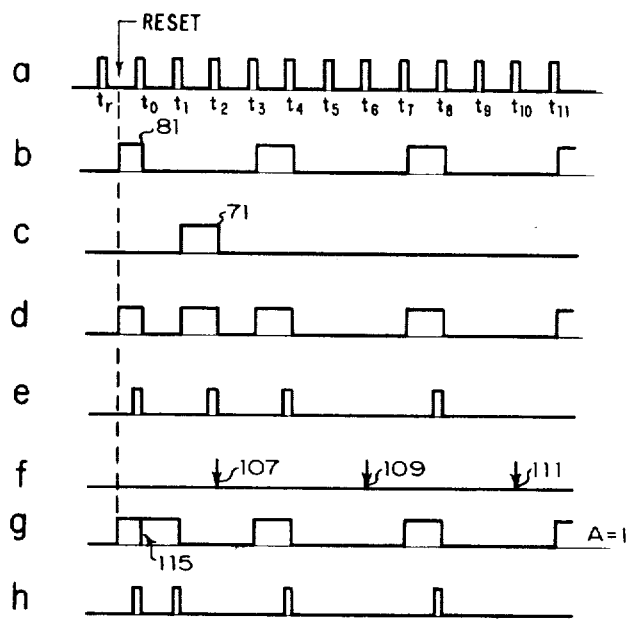
FIGS. 2a–h show typical waveforms produced by the apparatus shown in FIG. 1.
Figure 4:
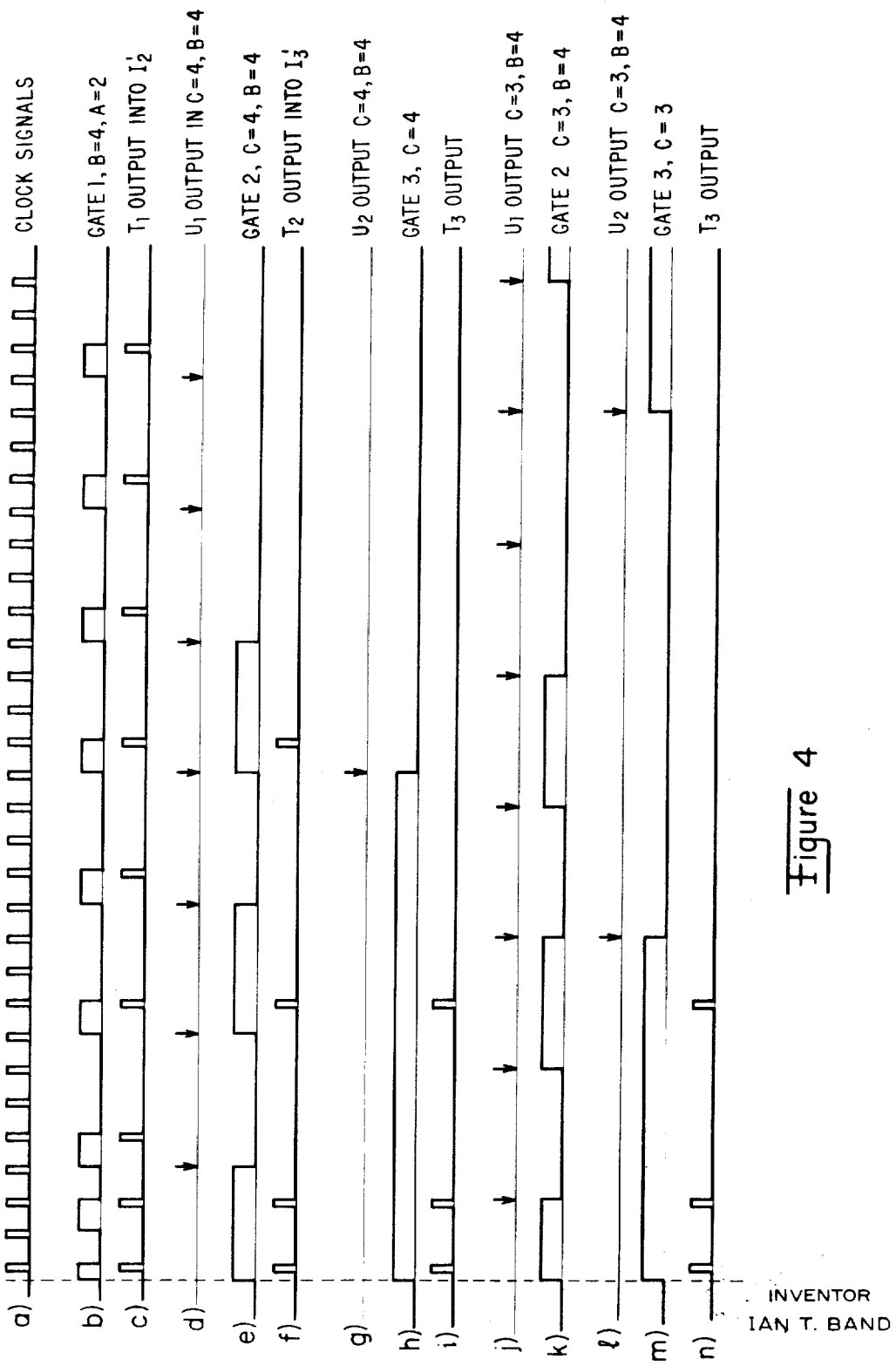
FIGS. 4a–n show typical waveforms of a gate control apparatus according to the present invention.

Referring now to FIG. 1 there is shown a single stage of the gate control apparatus of the present invention. Counter 13 is a conventional single digit counting assembly that may be, but is not limited to, a binary or decimal counter, a recirculating shift register or other counting device. A reset signal applied to input R of selective timing means 11 causes the counter 13 to reset to an initial state. The initial state is determined by the particular design of the counter 13 and for the purpose of this description the initial state will be that state which causes the counter 13 to register the number 0. A train of periodic pulses as shown in FIG. 2a is applied to the counter 13 through drive input I of selective timing means 11. The first input pulse following a reset signal causes the counter to advance from zero to one and each input pulse thereafter advances the counter 13 by one count. When the counter 13 has advanced B counts, where B is an integer determined by the design of the counter, the counter resets to its initial state. B will be assumed to be 4 for the purpose of this description.

The counter 13 has an output 15 connected to decoder 16 for producing a first signal representing the number of counts registered in the counter. Conventional decoder 16 produces a true level at output 17 in response to a signal representing A counts appearing at output 15 of counter 13 and produces a false level at output 17 in response to a signal at output 15 of counter 13 representing other counts. The value of A is determined by the design of the decoder and this may be one or more integer values such that $1 \leq A \leq (B-1)$. Therefore, with $B = 4$, $A = 1, 2$ or $3$.

Another output 18 of counter 13 is connected to logic element 14 to produce a signal that indicates the counter is in its first cycle of operation, i.e. between the time the counter has been reset by a reset signal applied at input R of selective timing means 11 and the time the counter advances B counts. Logic element 14 produces a true level at output 20 in response to it detecting the first cycle of operation of counter 13 and produces a false level at output 20 in response to the counter being in subsequent cycles.

Outputs 17 and 20 of decoder 16 and logic element 14, respectively, are connected to the input of AND gate 25. FIGS. 2a–e are graphs of typical waveforms produced by the apparatus in FIG. 1 having the parameters $B = 4$ and $A = 2$. FIG. 2c shows the output 27 of AND gate 25 going to a true level 71 in response to decoder 16 detecting A counts, i.e. two counts being registered in counter 13 during the first cycle of operation of the counter.

Counter 13 has an output 21 connected to logic element 22 for producing a signal whenever the counter 13 is in its initial state. Logic element 22 produces a true level at output 23 in response to the counter 13 being in its initial state and produces a false level in response to the counter being in any other state. FIG. 2b shows output 23 of logic element 22 going to a true level 81 in response to a reset signal being applied at input R at time $t_r$ and in response to the counter 13 resetting to its initial state after counting B counts, i.e. four counts.

Output 27 of AND gate 25 and output 23 of logic element 22 are connected to the input of OR gate 29. The output of OR gate 29 forms output V of selective timing means 11 and FIG. 2d shows this output V going to a true level in response to a true level at either of its inputs.

Gating means 41 in FIG. 1 has inputs I' and V' and an output T. Input V' is connected to output V of selective timing means 11 for enabling gate 43 in response to a true level at output V.

Therefore, if drive input I of selective timing means 11 is connected to signal pulse input I' of gating means 41 and a train of pulses having a period of repetition T (as shown in FIG. 2a) is applied to these inputs, pulse $AB^0+1$ (pulse 3, $A = 2$) and each pulse $nB+1$ (pulses 1, 5, 9 ... $nB+1$, $B = 4$) will be passed by gate 43 to gating means output T. These pulses will occur at times $t = t_2$, $t_0, t_4, t_8 \ldots t_{nB}$, respectively, as shown in FIG. 2e.

Counter 13 has an additional output which forms output U of selective timing means 11. Each time the number B is registered in the counter a signal (herein called a carry signal) appears at this output. To determine when a first carry signal will occur following a reset signal it is necessary to know the initial state of the counter. If, for example, $B = 4$ and the initial state of the counter is that state which causes the counter to register the number 1, the first carry signal will occur in response to the third signal pulse applied to the counter. Thereafter, carry signals will occur in response to every B signal pulse applied to the counter. Therefore, a carry signal occurs in response to $C+nB$ signal pulses appearing at drive input I of selective timing means 11 following a reset signal, where C is an integer defined by $(A+1) \leq C \leq B$. FIG. 2f shows carry signals produced by the apparatus in FIG. 1 for $B = 4$, $A = 2$ and $C = 3$. Carry signal 107 occurs after C pulses, carry signal 109 occurs after $C+1B$ (3+4) pulses and carry signal 111 occurs after $C+2B$ pulses, etc.

To aid the reader in understanding the relationship between parameters A and B, output V of selective timing means 11 is shown in FIG. 2g for $B = 4$, $A = 1$. A first pulse into counter 13 after a reset signal has appeared at input R causes the counter to advance from its initial state and to register one count. Thereby output 23 of logic element 22 switches to a false level causing output V of selective timing means 11 to momentarily switch to a false level. Concurrently, decoder 16 and logic element 14 have detected A (one) counts being registered by counter 13 during the first cycle of operation and output 27 of AND gate 25 switches to a true level causing output V of selective timing means 11 to return to a true level. This is indicated in FIG. 2g as a pulse 115. Assuming inputs I and I' are connected together and a pulse train as shown in FIG. 2a is applied to these inputs, pulses will be gated through gating means 41 to output T as shown in FIG. 2h.

Thus, for a single stage of the gate control apparatus having both the drive and signal pulse inputs connected to a source of signal pulses having a period of repetition T, output signals will appear at the gated output at times $t = AB^0T = AT$, and $t = nBT = 0, BT, 2BT, \ldots nBT$.

Referring now to FIG. 3 there is shown a block representation of the gate control apparatus of the present invention. Each stage is similar to the stage shown in FIG. 1. The first stage 311 has inputs $I_1$ and $I'_1$ connected together. All stages have a common reset line. The carry output U of preceding stages is connected to the drive input I of succeeding stages and the gated output T of preceding stages is connected to the signal pulse input I' of succeeding stages.

In accordance with one intention of the present invention, it can be shown that if all stages of the gate control apparatus have identical parameters A, B and C, and an input signal having a period of repetition T is applied to the input $I_1$ and $I'_1$ of the first stage, an output pulse will appear at output $T_x$ (the gated output of the xth stage) at times $t = AB^0T$, $t = AB^1T \ldots AB^{x-1}T$ and $t = nBT$. In like manner it can be shown that for each input signal pulse $AB^0+1$, $AB^1+1 \ldots AB^{x-1}+1$ and $nB^x+1$ at inputs $I_1$ and $I'_1$, an output signal will appear at output $T_x$.

FIGS. 4a–i represent typical waveforms of a three stage ($x = 3$) gate control apparatus, each stage having parameters $A = 2$, $B = 4$, $C = 4$. A train of periodic clock signals (FIG. 4a) is applied to the input of the first stage of the gate control apparatus. The output of the selective timing means of the first stage appears in FIG. 4b. Following a reset signal being applied at the reset input of the gate control apparatus, an output signal appears (FIG. 4c) at output $T_1$ of the first stage in response to $AB^0+1$ and $nB^x+1$ input signals. A carry signal appears (FIG. 4d) at output $U_1$ of the first stage in response to $C+nB$ input signals.

The carry output of the first stage provides signals to the drive input of the second stage. The output of the selective timing means of the second stage appears in FIG. 4e. Output signals appear (FIG. 4f) at output $T_2$ of the second stage in response to $AB^0+1$, $AB^1+1$ and $nB^x+1$ input signals at drive input $I_1$ of the first stage. A carry signal appears (FIG. 4g) at output $U_2$ of the second stage in response to $C+nB$ signals into the drive input of that stage.

The carry output of the second stage provides signals to the drive input of the third stage. The output of the selective timing means of the third stage appears in FIG. 4h. Output signals appear (FIG. 4i) at output $T_3$ of the third stage in response to $AB^0+1$, $AB^1+1$, $AB^2+1$ and $nB^x+1$ input signals at drive input $I_1$ of the first stage.

FIGS. 4a-c and 4j-n represent typical waveforms for a three stage ($x=3$) gate control apparatus, each stage having parameters $A = 2$, $B = 4$, and $C = 3$. These figures demonstrate the effect of making $C < B$.

Referring now to FIG. 5 there is shown a simplified block diagram of the improved automatic frequency measuring device of the present invention. Gate control apparatus 511 forms the heart of the present invention. Apparatus 511 is shown having six stages ($x = 6$) and for this example $A = 1, B = 10, C = 10$.

Conventional decade counting and display assembly 513 counts and displays up to six digits of information and it has an input 543 for receiving an unknown input signal to be counted, a reset input to reset the assembly 513 to an initial state and an output 541 for providing a signal whenever a 9 is registered in the fifth decade. Output 541 is connected to an input of OR gate 517.

A reference frequency source 527 having an output 533 is connected to input 535 of pulse shaper 529. The pulse shaper output 537 is then connected to drive input A of gate control apparatus 511.

A signal having an unknown frequency is connected to input B of AND gate 519. AND gate 519 has its output connected to input 543 of decade counting and display assembly 513.

A reset signal is applied to the frequency measuring device at the reset inputs shown in FIG. 5. The decade counting and display assembly 513 is set to an initial state of 000000. D-type flip-flop 525 is reset causing output Q to be at a false level and thereby disabling AND gate 519. Output $\bar{Q}$ of flip-flop 515 goes to a true level in response to the reset signal and arms the "D" input of flip-flop 525.

A first signal pulse appearing at drive input A of gate control apparatus 511 following the reset signal will be gated through the apparatus 511 and will appear at the gated output $T_6$ of the last stage. Output $T_6$ is connected to decimal point and units register 523 and to the clock input of flip-flop 525. This first signal pulse causes flip-flop 525 to set output Q to a true level, enabling AND gate 519 and thereby permitting the unknown input frequency to be passed to the decade counting and display assembly 513. Subsequent signal pulses from output $T_6$ of gate control apparatus 511 will not cause flip-flop 525 to reset until flip-flop 515 is set again and therefore they will not terminate the time interval during which the unknown frequency is being counted. These subsequent signal pulses occur at times $t = 1T(AB^0T)$, $10T(AB^1T)$, $100T$, $10^3T$, $10^4T$, $10^5T$ and $t= n10^6T(nB^xT)$. If the period of repetition of the reference frequency source is chosen to be $T = 10^{-6}$ sec., the time intervals which are generated will be 1 $\mu$s, 10$\mu$s, 100$\mu$s, 1 ms, 10 ms, 100 ms, 1 sec, 2 sec, 3 sec, etc.

The first signal pulse from output $T_6$ of gate control apparatus 511 that appears after flip-flop 515 has been set will cause flip-flop 525 to change states, disable AND gate 519 and thereby terminate the time interval during which the unknown input signal was counted. While $n<2$, each time interval generated by the gate control apparatus 511 increases the time interval by a factor of ten. Flip-flop 515 should be set therefore when the decade counting and display assembly 513 reaches a value of approximately 10 percent of full scale. This will cause the time interval to be terminated prior to the assembly 513 overflowing. When a 9 is detected in the fifth decade of assembly 513 (i.e. 9 percent full scale), a signal will appear at output 541 to set flip-flop 515.

To obtain the best measurement possible within the time range of the gate control apparatus the carry output $U_6$ from the last stage of gate control apparatus 511 is also connected to OR gate 517. This will cause the time interval to terminate at some time before $n = 2$, and therefore each time interval generated will be ten times longer than the preceding one. Decimal point and units register 523 counts the number of pulses coming from output $T_6$ and shifts a decimal point in response to the count. The units (Hz, kHz, etc.) are also determined by the count.

Alternatively, output 541 of assembly 513 could be connected to set flip-flop 515 in response to other numbers being registered in one or more of the decades and the carry output of any stage in gate control apparatus 511 could be used to set flip-flop 515.

It can be shown that if the frequency reference source 527 is connected to input B of AND gate 519 and an unknown signal having a period T is connected to input 535 of pulse shaper 537, upon the initiation of a measurement the average period of a number of periods of the unknown signal will be measured and the number of periods averaged will be determined automatically after the initiation of the measurement.

Therefore, in accordance with another intention of the present invention, applicant has disclosed a frequency measuring device that automatically determines the time interval during which the frequency of an unknown input signal is to be counted after the initiation of a measurement so that the greatest accuracy can be achieved in a single measurement. The device can also be used to automatically determine the number of periods of an unknown input signal that are to be averaged.

I claim:

1. Selective timing means comprising:

logic means to divide an input signal by "B", having a reset input for setting said logic means to an initial state in response to a signal being applied thereto, a drive input for altering said initial state by one count in response to each signal pulse being applied thereto and having a first output for producing signals representing a number stored in said logic means, a second output for producing a true level signal in response to the logic means being in a first cycle of operation, a third output for producing a true level signal in response to said logic means being in the initial state and a carry output for producing a signal in response to a number B being stored in said logic means, wherein B is an integer greater than 1 and said first cycle of operation begins upon a signal being applied to the reset input of said logic means and ends when a number B of signal pulses have been applied to the drive input of said logic means;

decoder means having an input connected to the first output of said logic means and having an output for producing a true level signal in response to a signal representing a number "A" appearing at said input, wherein A is an integer greater than 0 and less than or equal to B−1;

first gating means having an input connected to the output of said decoder means, an input connected to the second output of said logic means and having an output for producing a true level signal in response to a number A being stored in said logic means during the first cycle of operation of said logic means; and second gating means having an input connected to the output of said first gating means, an input connected to the third output of said logic means and having an output for producing a true level signal in response to either the logic means being in an initial state or a number A being stored in said logic means during said first cycle of operation.

2. Apparatus as in claim 1 and including:
a third gating means having an input connected to the output of said second gating means, an input connected to the drive input of said logic means and having a gated output for producing an output signal pulse in response to A+1 and $n$B+1 signal pulses appearing at the drive input of said logic means wherein $n$ is an integer 0 or greater.

3. Apparatus as in claim 1 and including:
a third gating means having a first input connected to the output of said second gating means and a second input and having a gated output for producing a signal at said output in response to true level signals at said first and second inputs.

4. Gate control apparatus comprising:
a plurality of apparatus as in claim 3, each of which forms a single stage of said gate control apparatus;

means connecting together the reset inputs of each stage to simultaneously set each stage to an initial state upon a signal being applied at any reset input;

means connecting the drive input of a first stage to the second input of the third gating means of that first stage;

means connecting the carry output of a preceding stage to the drive input of a succeeding stage;

means connecting the gated output of the third gating means of a preceding stage to the second input of the third gating means of a succeeding stage for producing a signal at the gated output of a last stage of said gate control apparatus in response to $AB^0+1$, $AB^1+1$ ... $AB^{x-1}+1$ and $nB^x+1$ signal pulses applied at the signal input of the first stage of said gate control apparatus, where $x$ is an integer representing the number of stages in said gate control apparatus and n is an integer 0 or greater.

* * * * *